(12) United States Patent
Huh et al.

(10) Patent No.: US 7,768,582 B2
(45) Date of Patent: Aug. 3, 2010

(54) LIQUID CRYSTAL DISPLAY

(75) Inventors: Il-Kook Huh, Yongin-si (KR);
Seung-Hoo Yoo, Seongnam-si (KR);
Eun-Hee Han, Seoul (KR);
Byeong-Seob Ban, Yongin-si (KR)

(73) Assignee: Samsung Electronics Co., Ltd.,
Suwon-Si (KR)

( * ) Notice: Subject to any disclaimer, the term of this patent is extended or adjusted under 35 U.S.C. 154(b) by 1239 days.

(21) Appl. No.: 11/331,929

(22) Filed: Jan. 13, 2006

(65) Prior Publication Data
US 2006/0158573 A1 Jul. 20, 2006

(30) Foreign Application Priority Data
Jan. 18, 2005 (KR) .................. 10-2005-0004513

(51) Int. Cl.
*G02F 1/133* (2006.01)
(52) U.S. Cl. .............................. 349/33; 349/38; 349/39; 345/94
(58) Field of Classification Search .................... 349/33
See application file for complete search history.

(56) References Cited

U.S. PATENT DOCUMENTS

| | | | |
|---|---|---|---|
| 5,841,499 A * | 11/1998 | Baur et al. .................. 349/141 |
| 6,490,013 B2 * | 12/2002 | Koma .......................... 349/33 |
| 7,433,012 B2 * | 10/2008 | Utsumi et al. ............... 349/181 |
| 2004/0041766 A1 * | 3/2004 | Nakao et al. .................. 345/89 |
| 2005/0024546 A1 * | 2/2005 | Kubo et al. .................... 349/33 |
| 2005/0140837 A1 * | 6/2005 | Crawford et al. .............. 349/42 |

FOREIGN PATENT DOCUMENTS

| | | |
|---|---|---|
| JP | 6-186535 | 7/1994 |
| KR | 2001-062067 | 7/2001 |
| KR | 2004-045100 | 6/2004 |

* cited by examiner

*Primary Examiner*—David Nelms
*Assistant Examiner*—Thanh-Nhan P Nguyen
(74) *Attorney, Agent, or Firm*—F. Chau & Associates, LLC

(57) ABSTRACT

A liquid crystal display comprises a first substrate having a pixel electrode, a second substrate adjacent to the first substrate and having a common electrode, and a liquid crystal layer disposed between the first substrate and the second substrate, wherein a black voltage applied to the pixel electrode is in a range of from about 3V to about 4.4V and a perpendicular direction dielectric constant $\in_\perp$ of liquid crystals in the liquid crystal layer is greater than or equal to about 0.27 times of a horizontal direction dielectric constant $\in_\parallel$ of the liquid crystals.

10 Claims, 14 Drawing Sheets

LIQUID CRYSTAL DISPLAY

CROSS-REFERENCE TO RELATED APPLICATIONS

This application claims priority to Korean Patent Application No. 2005-0004513, filed on Jan. 18, 2005, the disclosure of which is incorporated herein by reference.

TECHNICAL FIELD

The present disclosure relates to a liquid crystal display, and more particularly to a liquid crystal display having an improved response time.

DISCUSSION OF RELATED ART

Generally, a liquid crystal display (LCD) widely used as a flat panel display is thinner, lighter and consumes less power than a cathode ray tube (CRT). The liquid crystal display comprises an upper substrate having a common electrode and a color filter, a lower substrate having a pixel electrode and a thin film transistor (TFT) and a liquid crystal layer disposed between the upper substrate and the lower substrate. Liquid crystal molecules in the liquid crystal layer change their alignment based on electric fields applied between the pixel electrode and the common electrode. A transmittance is modulated based on change of the alignment of the liquid crystal molecules. A response time (Tre) of the liquid crystal molecules is a factor in displaying a good quality moving images because a motion blur occurs when the response time is too long.

SUMMARY OF THE INVENTION

Exemplary embodiments of the present invention provide a liquid crystal display having an improved response time.

In an embodiment of the present invention, a liquid crystal display comprises a first substrate having a pixel electrode, a second substrate adjacent to the first substrate and having a common electrode, and a liquid crystal layer disposed between the first substrate and the second substrate, wherein a black voltage is applied to the pixel electrode in a range of from about 3V to about 4.4V and a perpendicular direction dielectric constant $\in_\perp$ of liquid crystals in the liquid crystal layer is about or over about 0.27 times of a horizontal direction dielectric constant $\in_\parallel$ of the liquid crystals.

An anisotropic dielectric constant of the liquid crystals is in a range of about 7 to about 12. A white voltage applied to the pixel electrode is about or less than about 0.5 times of a 10% voltage, wherein the 10% voltage refers to a voltage when a transmittance falls by 10% from a white state. A storage capacity is about or over about 0.5 times of a liquid crystal capacity. A cell gap in the pixel electrode is about 4.0 µm.

In another embodiment of the present invention, a liquid crystal display comprises a pixel electrode, and a liquid crystal layer comprising a plurality of liquid crystal molecules, wherein a black voltage applied to the pixel is in a range from about 3V to about 4.4V and a perpendicular direction dielectric constant $\in_\perp$ of the liquid crystal molecules is greater than or equal to about 0.27 times of a horizontal direction dielectric constant $\in_\parallel$ of the liquid crystal molecules.

BRIEF DESCRIPTION OF THE DRAWINGS

Preferred embodiments of the present disclosure can be understood in more detail from the following descriptions taken in conjunction with the accompanying drawings of which.

DETAILED DESCRIPTION OF THE PREFERRED EMBODIMENT

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
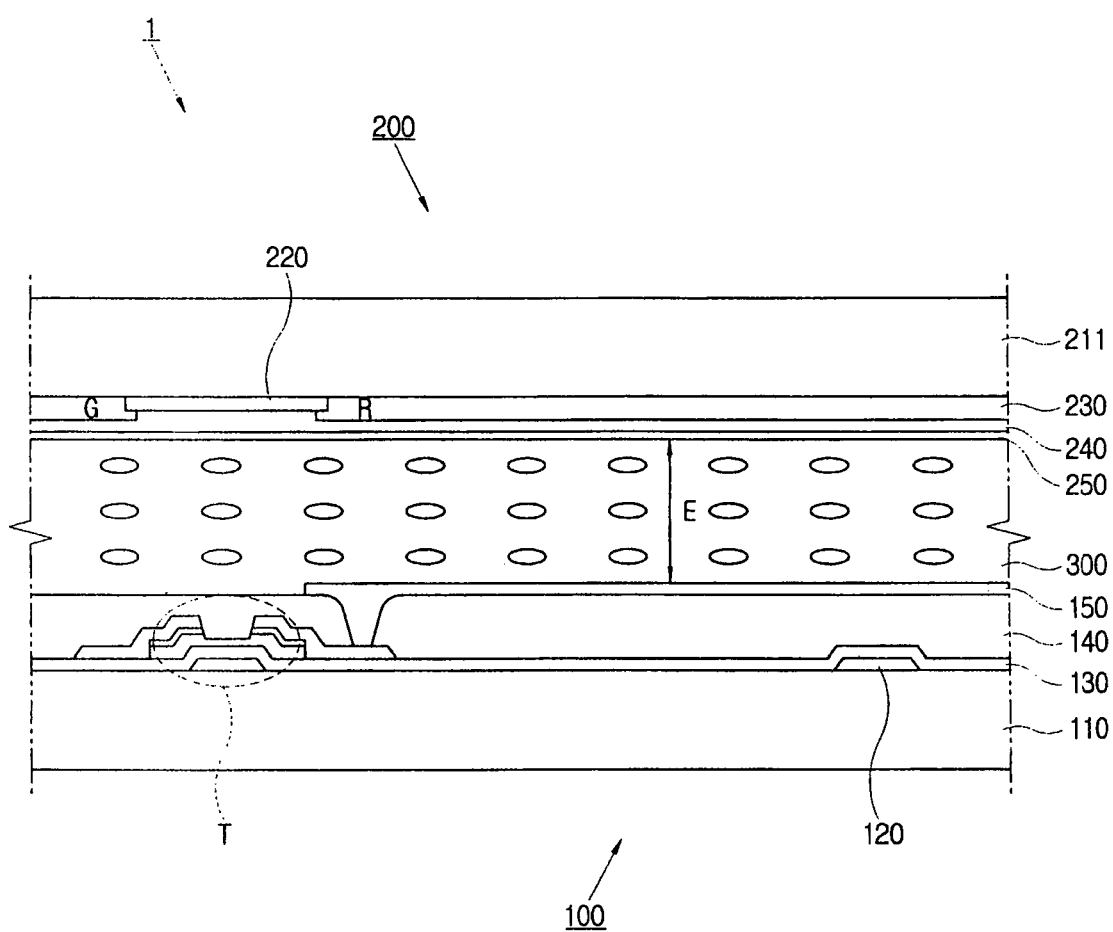
FIG. 1 is a sectional view of a liquid crystal display showing an alignment of liquid crystals at a white state according to an embodiment of the present invention.
Figure 2:
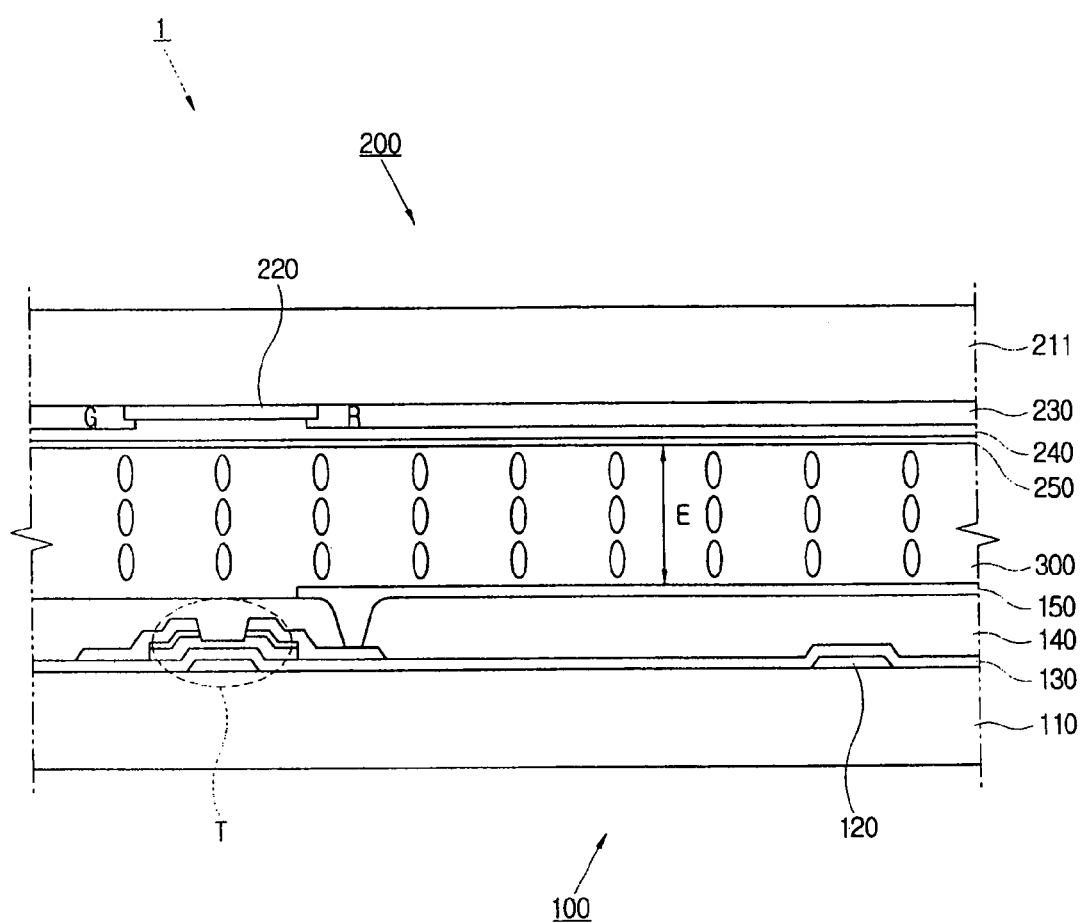
FIG. 2 is a sectional view of a liquid crystal display showing an alignment of liquid crystals at a black state according to an embodiment of the present invention.

FIGS. 1 and 2 are sectional views of a liquid crystal display showing an alignment of liquid crystals at a white state and a black state, respectively, according to an embodiment of the present invention. The liquid crystal display 1 comprises a first substrate 100, a second substrate 200 and a liquid crystal layer 300 disposed between the first substrate 100 and the second substrate 200.

A storage capacitor electric line 120 is provided to form a thin film transistor T and a storage capacitor Cst on a first insulating substrate 110 of the first substrate 100. The thin film transistor T is covered with a passivation layer 140 and the storage capacitor electric line 120 is covered with a gate insulating layer 130 and the passivation layer 140. A pixel electrode 150 electrically connected to the thin film transistor T is formed on the passivation layer 140.

A black matrix 220 and a color filter 230 having red (R), green (G) and blue (B) color elements are formed on a second insulating substrate 210 of the second substrate 200. The black matrix 220 is positioned between alternating red (R), green (G) and blue (B) color elements. The black matrix 220 and the color filter 230 are covered with an overcoat layer 240. A common electrode 250 is formed on the overcoat layer 240.

The liquid crystal layer 300 is disposed between the first substrate 100 and the second substrate 200. Liquid crystals in the liquid crystal layer 300 change their alignment based on the change of an electric field to display various images.

The liquid crystal display 1 is a normally white twisted nematic mode type display. As shown in FIG. 1, major axes of liquid crystals in the liquid crystal layer 300 are aligned horizontally and perpendicular to the direction of the electric field E at a white state. As shown in FIG. 2, the major axes of liquid crystals in the liquid crystal layer 300 are aligned vertically and parallel to the direction of the electric field E at a black state.

Figure 3:
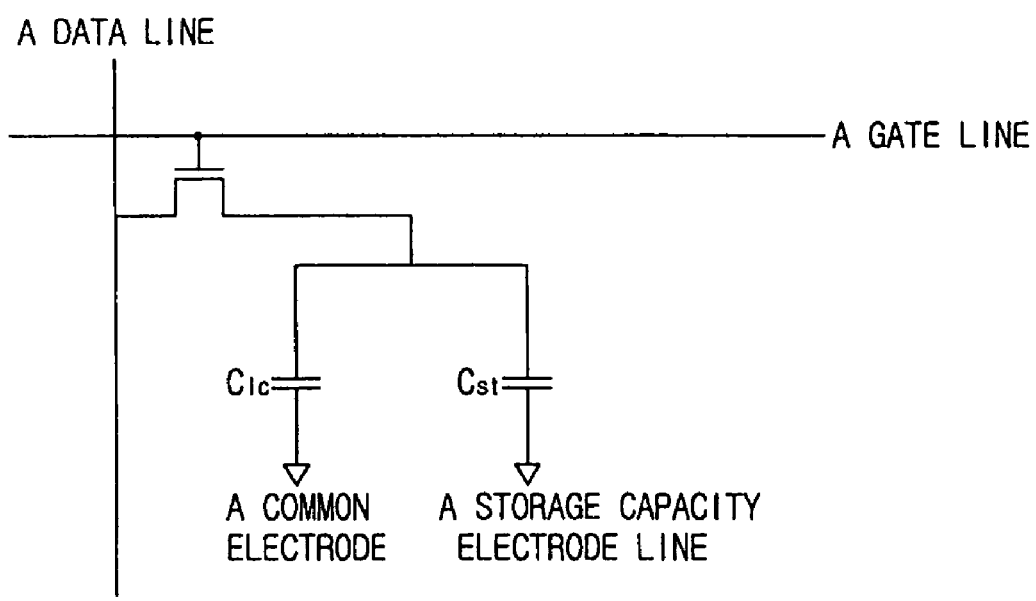
FIG. 3 is an equivalent circuit view of the liquid crystal display according to an embodiment of the present invention.

FIG. 3 is an equivalent circuit view of the liquid crystal display according to an embodiment of the present invention. The thin film transistor T is connected to a gate line and a data line crossing each other. A liquid crystal capacitor Clc and the storage capacitor Cst are connected to the thin film transistor T. The liquid crystal capacitor Clc generates a capacitance in the liquid crystals between the pixel electrode 150 and the common electrode 250. The storage capacitor Cst generates a capacitance in the gate insulating layer 130 and the passivation layer 140 between a storage capacitor electric line 120 and the pixel electrode 150. The storage capacitor Cst can be formed in different ways as the pixel electrode 150 is overlapped, for example, with a gate line.

Figure 4:
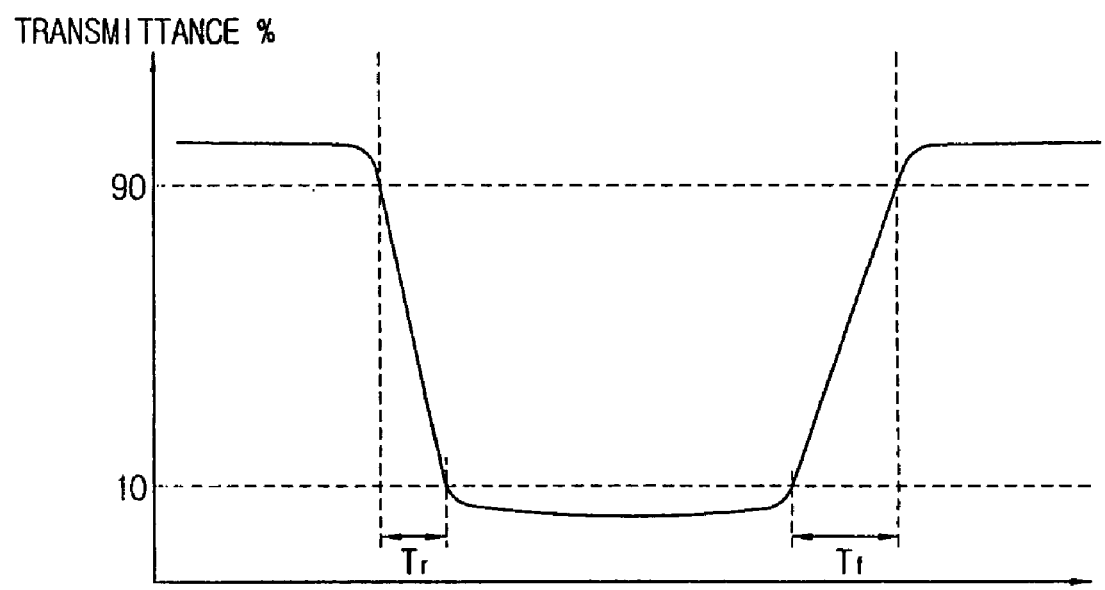
FIG. 4 is a graph showing transmittance with respect to time in the liquid crystal display.

FIG. 4 is a graph showing the change of the transmittance with respect to time in the liquid crystal display 1. FIG. 4 shows a rising time and a falling time.

A response time (Tre) refers to a sum of a rising time Tr and a falling time Tf. The rising time Tr refers to the time taken to reach a stable state by aligning the liquid crystals in the direction of the electric field when the electric field is generated between the pixel electrode 150 and the common electrode 250 by a driving voltage. The falling time Tf refers to the time taken to return to an original stable state of the liquid crystals by cutting off the electric field. In other words, the rising time Tr is defined by a time to change the transmittance from 90% to 10% and the falling time Tf is defined by a time to change the transmittance from 10% to 90%.

Figure 5:
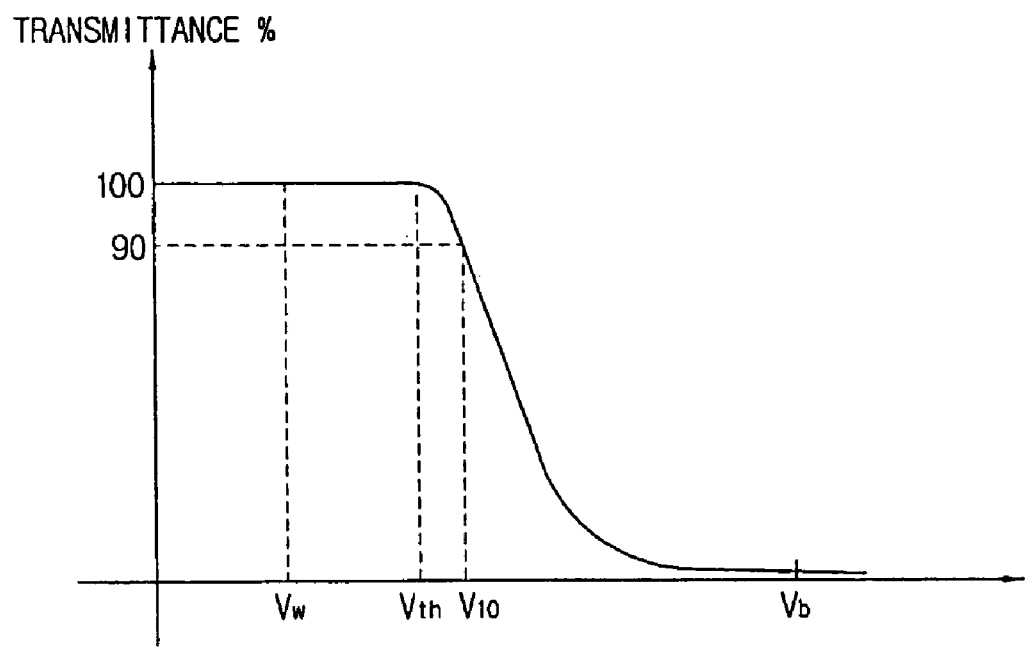
FIG. 5 is a graph showing transmittance with respect to a driving voltage in the liquid crystal display.

FIG. 5 is a graph showing a transmittance with respect to a driving voltage in the liquid crystal display 1. A threshold voltage $V_{th}$ refers to a voltage when the change of transmittance occurs sharply. A 10% voltage $V_{10}$ refers to the voltage when the transmittance falls by 10% from the white state. A white voltage Vw refers to the voltage displaying the brightest color. A black voltage Vb refers to the voltage displaying the darkest color. The black voltage Vb is the highest voltage among driving voltages and the white voltage Vw is the lowest voltage among driving voltages in the normally white twisted nematic mode display.

Figure 6:
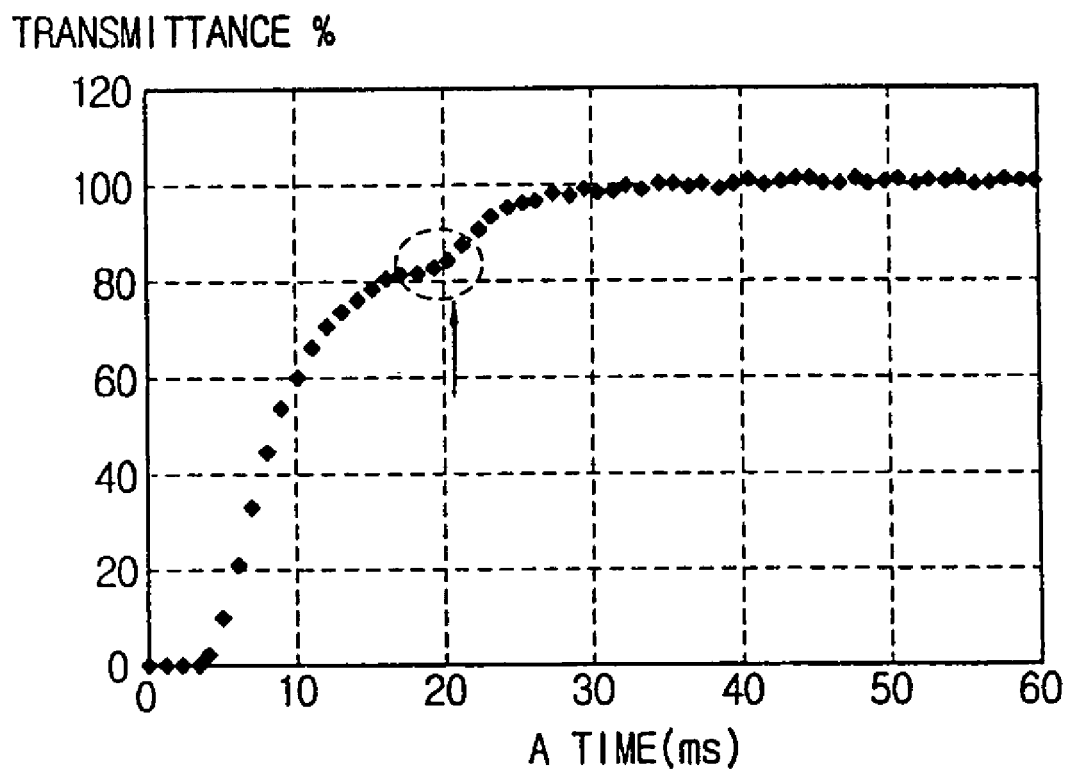
FIG. 6 is a graph showing transmittance with respect to time for the occurrence of a cusp.
Figure 7:
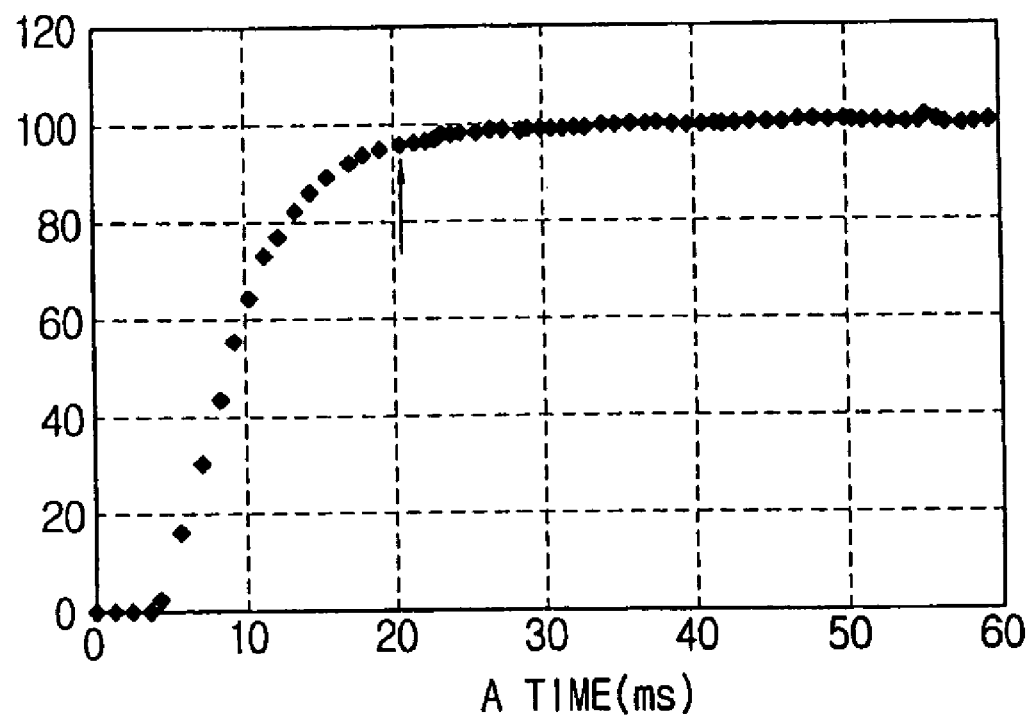
FIG. 7 is a graph showing transmittance with respect to time when a driving voltage applied to liquid crystals is constant.

The response time of the liquid crystal display 1 is explained referring to FIGS. 6 and 7 in the normally white twisted nematic mode display. According to the graph showing the transmittance versus time, a time of one frame is about 16.6 ms (60 Hz) and a signal is applied in 4 ms later, thus the transmittance of a first frame is the transmittance at about 20.6 ms.

FIG. 6 is a graph showing a transmittance with respect to time and shows the occurrence of a cusp. FIG. 7 is a graph showing a transmittance with respect to time when a voltage applied to the liquid crystals is constant.

The voltage V applied to the liquid crystals for one frame is expressed by the formula 1.

$$V = \frac{Q}{Cst + Clc} \quad \text{Formula 1}$$

Here, Q is the amount of an electric charge applied to the liquid crystals, Clc is the liquid crystal capacitance and Cst is the storage capacitance.

The liquid crystal capacitance Clc is changed in the one frame due to an anisotropic dielectric constant. Therefore, the voltage V applied to the liquid crystals is changed. As shown in FIG. 6, the generation of a cusp (encircled) where the transmittance is not changed is detected. The transmittance does not increase with time where the cusp is generated. Thus, the response time becomes longer. The response time becomes longer when the cusp is generated under 90% transmittance. The response time is 20.01 ms as shown in FIG. 6.

FIG. 7 is a graph showing a transmittance with respect to time when a voltage applied to the liquid crystals is constant. As shown in FIG. 7, the cusp is not generated and the response time is 12.32 ms.

A low consumption voltage is also an important factor for the liquid crystal display 1 applied to a portable computer or a portable display device. Thus, the black voltage Vb, that is, the highest voltage among various driving voltages, is limited in the range from about 3V to about 4.4V. Therefore, molecules in the liquid crystal layer 300 having a large anisotropic dielectric constant can be used to produce the black state in the range from about 3V to about 4.4V. However, a large anisotropic dielectric constant may generate the cusp.

The cusp may be avoided or generated at over 90% transmittance by controlling the ratio of the perpendicular direction dielectric constant $\in_\perp$ to the horizontal direction dielectric constant $\in_\parallel$ the size of the white voltage Vw and the ratio of the storage capacitance Cst to the liquid crystal capacitor Clc in the liquid crystal display 1. Details of factors controlling the cusp are explained as below.

The Ratio of Perpendicular Direction Dielectric Constant $\in_\perp$ to Horizontal Direction Dielectric Constant $\in_\parallel$ The voltage applied to the liquid crystals for one frame is expressed by formula 1. The relation of the dielectric constant $\in$ of the liquid crystals and the liquid crystal capacitance Clc is expressed by formula 2.

$$Clc = \varepsilon 0 \cdot \varepsilon \cdot \frac{A}{d} \quad \text{Formula 2}$$

Here, $\in_0$ is the dielectric constant of the liquid crystals at vacuum, A is the area of a pixel electrode and d is a cell gap. The liquid crystal capacitance is expressed as formula 4 when Klc is introduced as a common parameter in the formula 2.

$$Klc = \varepsilon 0 \cdot \frac{A}{d} \quad \text{Formula 3}$$

$$Clc = \varepsilon \cdot Klc \quad \text{Formula 4}$$

The voltage applied to the liquid crystals may be expressed by the dielectric constant of the liquid crystals. Namely, the voltage applied to the liquid crystals depends on the dielectric constant of the liquid crystals.

$$V = \frac{Q}{Cst + \varepsilon \cdot Klc}$$ Formula 5

The change of the voltage is explained using formula 5 when the black state is converted to the white state by applying the white voltage. For example, the perpendicular direction dielectric constant $\in\perp$ is 4.4 and the horizontal direction dielectric constant $\in_\parallel$ is 17. The longer or major axes of the liquid crystals are aligned vertically in a direction of an electric field at an original state. The dielectric constant of the liquid crystals is dominated by the horizontal direction dielectric constant $\in_\parallel$ and the initial voltage Vi is expressed like formula 6.

$$Vi = \frac{Q}{Cst + 17.0 \cdot Kls};$$ Formula 6

When the voltage is applied, the liquid crystals are aligned horizontally and the dielectric constant of the liquid crystals is dominated by the perpendicular direction dielectric constant $\in\perp$. The final voltage Vf is higher than the initial voltage $V_i$ as shown by formula 7.

$$Vf = \frac{Q}{Cst + 4.4 \cdot Klc};$$ Formula 7

A low white voltage is applied before a high voltage because the liquid crystal capacitance changes. The change of the voltage may generate the cusp. To avoid the generation of the cusp, the change of the liquid crystal capacitance should be minimized.

The liquid crystal capacity at the white state Clcw and the liquid crystal capacity at the black state Clcb are expressed by formula 8.

$$Clcw = \varepsilon 0 \cdot \varepsilon \perp \cdot \frac{A}{d}$$ Formula 8

$$Clcb = \varepsilon 0 \cdot \varepsilon \parallel \cdot \frac{A}{d}$$

Clcw/Clcb is expressed by $\in_\perp/\in_\parallel$ as shown by formula 9.

$$Clcw/Clcb = \varepsilon 0 \cdot \varepsilon \perp \cdot \frac{A}{d} \bigg/ \varepsilon 0 \cdot \varepsilon \parallel \cdot \frac{A}{d} = \frac{\varepsilon \perp}{\varepsilon \parallel}$$ Formula 9

Converging Clcw/Clcb or $\in\perp/\in_\parallel$ to 1 may reduce the change of the liquid crystal capacitance.

Table 1 below shows the change of the voltage based on the change of the horizontal direction dielectric constant $\in_\parallel$ when the perpendicular direction dielectric constant $\in\perp$ is 3.58. Table 2 shows change of the voltage based on the change of the perpendicular direction dielectric constant $\in\perp$ when the horizontal direction dielectric constant $\in_\parallel$ is 10.68. The data of table 1 and table 2 are produced by simulations applying the white voltage $V_w$ to the black state. The white voltages $V_w$ are 0.7V or 0.5V. The black voltage is 3.8 V and the cell gap is 4.0 μm.

TABLE 1

| | | $\in_\parallel$ | | | | |
|---|---|---|---|---|---|---|
| Vw(V) | Clcb(pF) | 10.68 0.446 | 9.68 0.404 | 8.68 0.362 | 7.68 0.321 | 6.68 0.279 |
| 0.7 | The voltage after one frame(V) | 1.269 | 1.189 | 1.109 | 1.029 | 0.949 |
| | The change of the voltage(V) | 0.569 | 0.489 | 0.409 | 0.329 | 0.249 |
| 0.5 | The voltage after one frame(V) | 0.907 | 0.849 | 0.792 | 0.735 | 0.677 |
| | The change of the voltage(V) | 0.407 | 0.349 | 0.292 | 0.235 | 0.177 |

TABLE 2

| | | $\in_\perp$ | | | | |
|---|---|---|---|---|---|---|
| Vw(V) | Clcb(pF) | 3.58 0.150 | 4.58 0.191 | 5.58 0.233 | 6.58 0.275 | 7.58 0.317 |
| 0.7 | The voltage after one frame(V) | 1.341 | 1.214 | 0.108 | 1.019 | 0.944 |
| | The change of the voltage(V) | 0.641 | 0.514 | 0.408 | 0.319 | 0.244 |
| 0.5 | The voltage after one frame(V) | 0.907 | 0.814 | 0.738 | 0.675 | 0.622 |
| | The change of the voltage(V) | 0.407 | 0.314 | 0.238 | 0.175 | 0.122 |

As shown in table 1, as the horizontal direction dielectric constant $\in_\parallel$ is reduced, the liquid crystal capacity in the black state Clcb is decreased. As shown in table 2, as the perpendicular direction dielectric constant $\in\perp$ is increased, the liquid crystal capacity in the white state Clcw is increased. Namely, as the horizontal direction dielectric constant $\in_\parallel$ is reduced and the perpendicular direction dielectric constant $\in\perp$ is increased, the change of the liquid crystal capacitance is reduced.

Voltage after one frame lapse is compared with the applied white voltage $V_w$. As the horizontal direction dielectric constant $\in_\parallel$ is reduced, the difference between the voltage after one frame lapse and the applied white voltage becomes smaller. Also, as the perpendicular direction dielectric constant $\in\perp$ is increased, the difference between the voltage after one frame lapse and the applied white voltage $V_w$ becomes smaller. Namely, as the horizontal direction dielectric constant $\in_\parallel$ is reduced and the perpendicular direction dielectric constant $\in\perp$ is increased, the voltage applied to the liquid crystals is similar to the white voltage.

As described above, as the ratio of the perpendicular direction dielectric constant $\in\perp$ to horizontal direction dielectric constant $\in_\parallel$ converges to 1, the change of the voltage is reduced.

Table 3 shows the response time according to the change of the $\in\perp/\in_\parallel$. The white voltage $V_w$ is 0.5V and the black voltage $V_b$ is 3.8V.

TABLE 3

| | Δε | ε∥ | ε⊥ | ε⊥/ε∥ | Tr(ms) | Tf(ms) | Tre(ms) |
|---|---|---|---|---|---|---|---|
| 1 | 6.6 | 9.7 | 3.1 | 0.340 | 5.27 | 9.92 | 15.19 |
| 2 | 8.8 | 12.4 | 3.6 | 0.280 | 4.25 | 11.73 | 15.98 |
| 3 | 9.9 | 13.5 | 3.6 | 0.266 | 4.81 | 15.20 | 20.01 |

Figure 8:
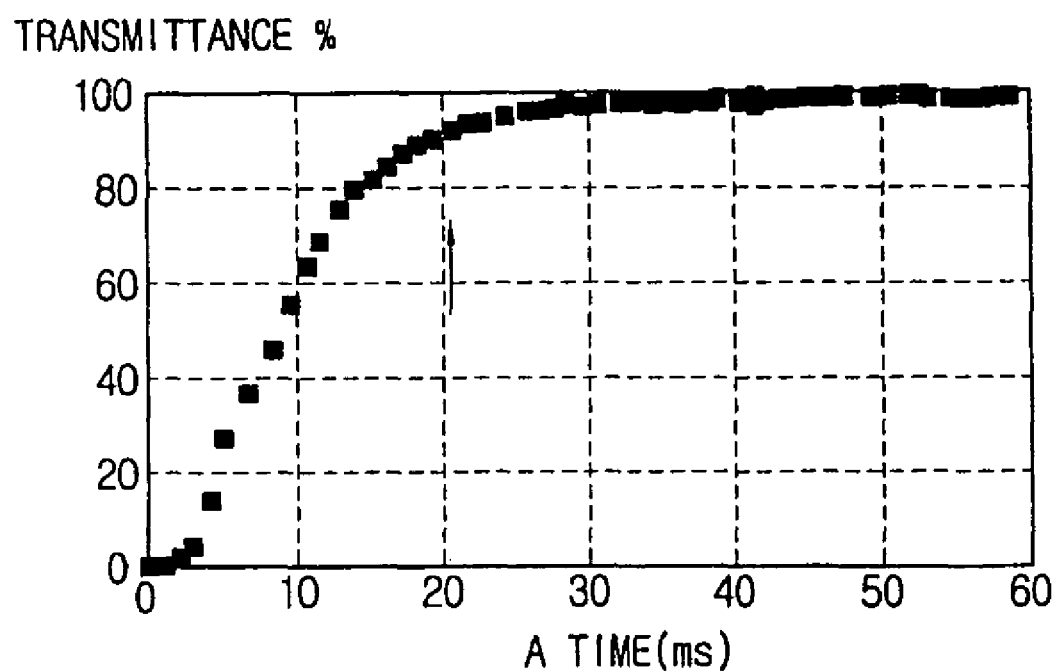
FIG. 8 is a graph showing transmittance with respect to time according to the first case in table 3.
Figure 9:
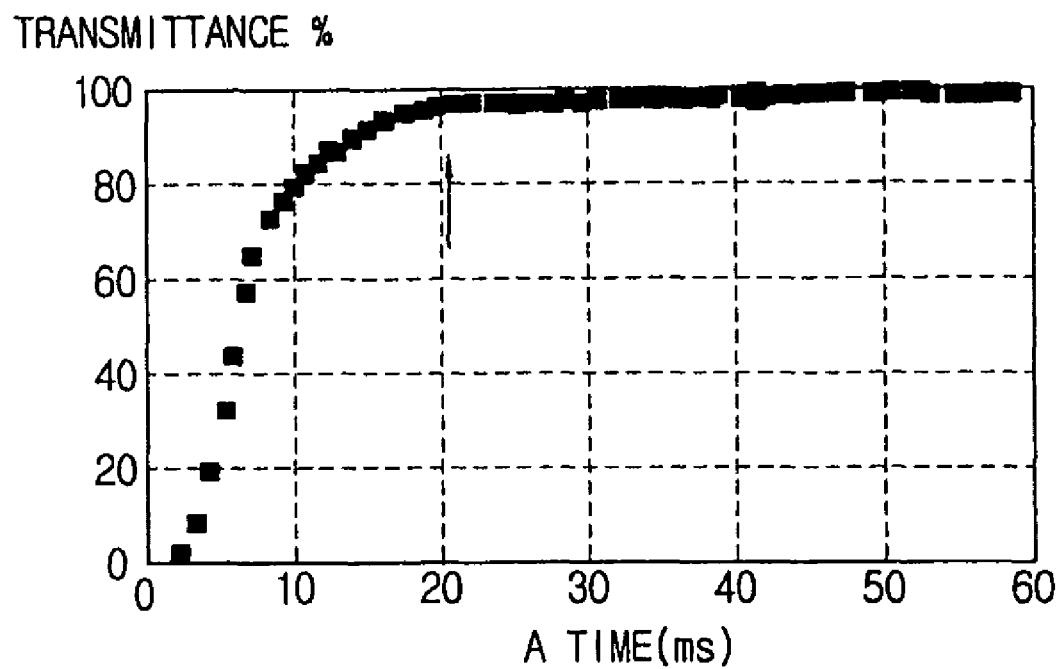
FIG. 9 is a graph showing transmittance with respect to time according to the second case in table 3.

As shown in table 3, the response times Tre are under 16 ms when $\in\perp/\in_\parallel$ is 0.340 and when $\in\perp/\in_\parallel$ is 0.280. Here, as shown in FIGS. 8 and 9, the cusp is barely generated. The response time Tre is 20.01 ms when $\in\perp/\in_\|$ is 0.266. Here, the cusp is generated when the transmittance is about 88%. As described above, the response time Tre becomes less than 16 ms when the $\in\perp/\in_\|$ is about or higher than 0.27.

Figure 10:
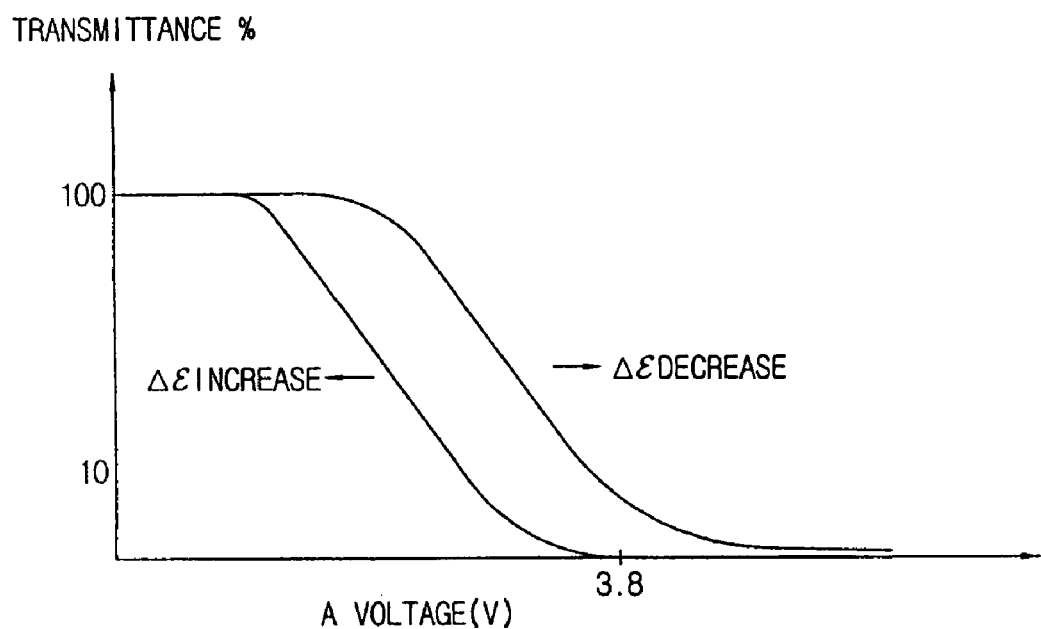
FIG. 10 is a graph showing transmittance with respect to a driving voltage applied to liquid crystals when an anisotropic dielectric constant changes.

The anisotropic dielectric constant $\Delta\in$ may be in the range of from about 7 to about 12. FIG. 10 is a graph showing the change of the transmittance according to a driving voltage applied to the liquid crystals having different anisotropic dielectric constants.

The liquid crystals with the anisotropic dielectric constant below about 7 do not align vertically by low voltage like 3.8V. Therefore, the perfect black state may not be obtained with 3.8 black voltage $V_b$. When the anisotropic dielectric constant of the liquid crystals is over about 12, the black state can be obtained with a low voltage. However, when the anisotropic dielectric constant is over about 12, the reliability of the black state becomes poor.

The White Voltage of the Liquid Crystal

As essentially described above, major axes of the liquid crystals are aligned horizontally and perpendicular to the direction of the electric field at a white state as shown in FIG. 1, and major axes of the liquid crystals are aligned vertically and parallel to the direction of the electric field at a black state as shown in FIG. 2 for a normally white twisted nematic mode display. Therefore, when a driving force F applied to the liquid crystals is large, the liquid crystals rotate rapidly from the perpendicular direction to the parallel direction or vice versa. Therefore, the response time becomes short.

The driving force F applied to the liquid crystals is expressed by formula 10.

$$F = \frac{VbwQ}{d} \quad \text{Formula 10}$$

Here, Vbw is the difference between the black voltage and the white voltage, d is cell gap and Q is the amount of electric charge. As the difference of the voltage increases, the driving force applied to the liquid crystals increases. Therefore, the liquid crystals rotate rapidly and the response time becomes shorter. The black voltage $V_b$ may not be increased by more than a certain voltage for a low driving voltage. However, the white voltage $V_w$ is adjustable.

Table 4 shows the response time Tre according to the change of the white voltage $V_w$. A 10% voltage $V_{10}$ is 0.2V. The perpendicular direction dielectric constant $\in\perp$ is 3.6 and the horizontal direction dielectric constant $\in_\|$ is 13.6. Thus, $\in\perp/\in_\|$ is 0.27. The anisotropic dielectric constant is 10. The black voltage $V_b$ is 3.8V and cell gap is about 4 μm.

TABLE 4

|   | Vw(V) | Tr (ms) | Tf (ms) | Tre (ms) | Clcw/Clcb |
|---|-------|---------|---------|----------|-----------|
| 1 | 0.5   | 4.81    | 15.20   | 20.01    | 0.266     |
| 2 | 0.3   | 4.90    | 14.11   | 19.01    | 0.266     |
| 3 | 0.1   | 4.95    | 10.91   | 15.86    | 0.266     |

Figure 11:
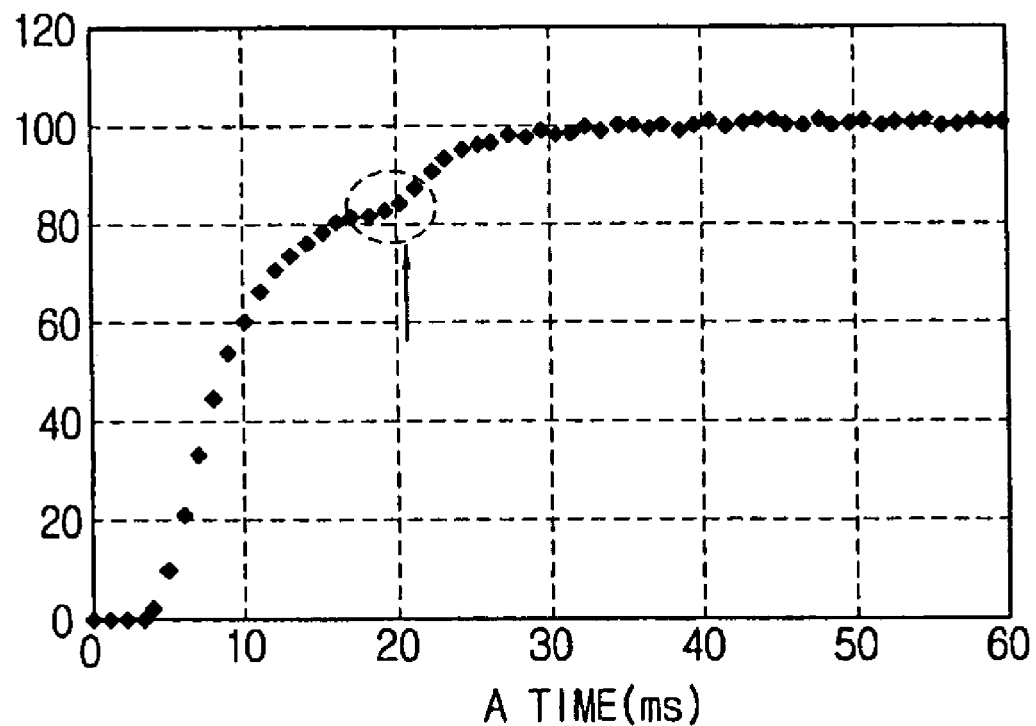
FIG. 11 is a graph showing transmittance with respect to time according to the first case in table 4.
Figure 12:
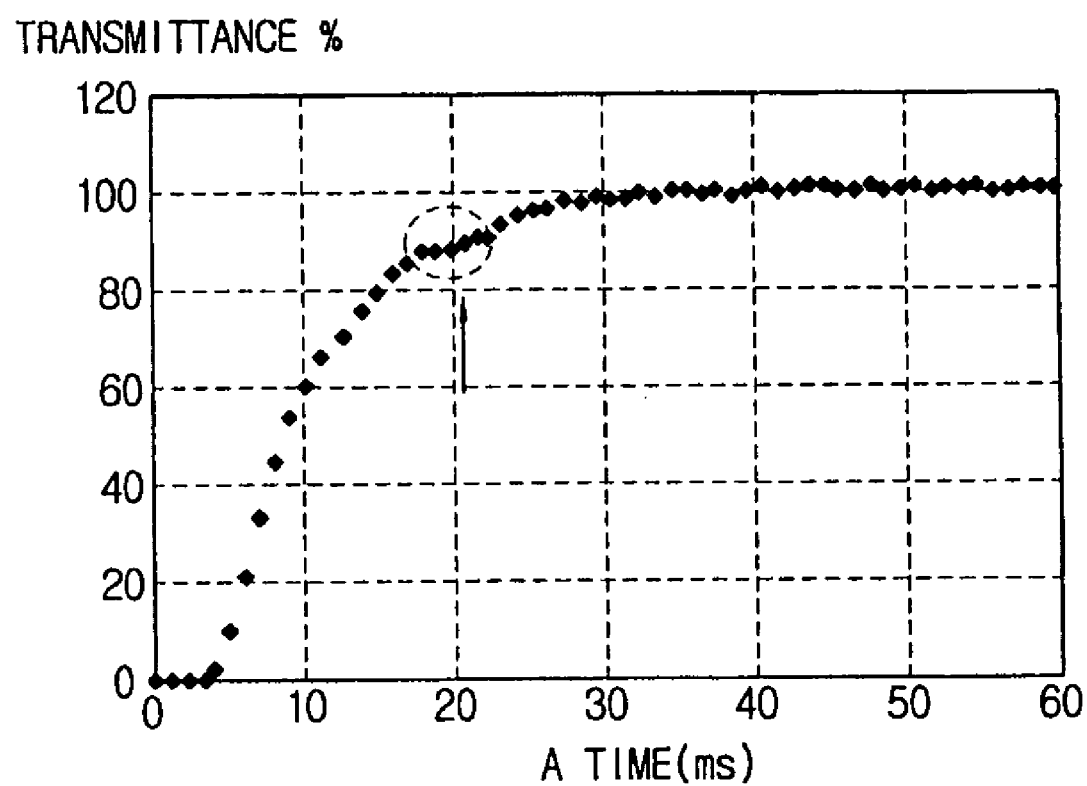
FIG. 12 is a graph showing transmittance with respect to time according to the second case in table 4.

FIG. 11 is a graph showing transmittance with respect to time in the first case of table 4. FIG. 12 is a graph showing transmittance with respect to time in the second case of table 4. The response time of the first case and the second case is 20.01 ms and 19.01 ms, respectively, and the cusp occurs under 90% transmittance. In the third case, the response time is 15.86 ms and the cusp occurs at the 90% transmittance.

As described above, the response time Tre is improved when the white voltage $V_w$ is less than about 0.5 times of the 10% voltage $V_{10}$. The result of table 4 is obtained by using the liquid crystals having $\in\perp/\in_\|$ of about 0.27. However, the same result (the white voltage is reduced) is obtained when $\in\perp/\in_\|$ of the liquid crystals is over about 0.27.

The Ratio of the Storage Capacitance to the Liquid Crystal Capacitance

The voltage applied to the liquid crystals for one frame is expressed by formula 1. As described above, the liquid crystal capacitance changes according to the alignment of the liquid crystals. The change of the voltage may be reduced when the ratio of the storage capacitance to the liquid crystal capacitance is increased because the storage capacitance is constant.

Table 5 shows the response time Tre according to the change of the ratio of the storage capacitance Cst to the liquid crystal capacitance Clc. The perpendicular direction dielectric constant $\in\perp$ is 3.6 and the horizontal direction dielectric constant $\in_\|$ is 13.6. Thus, $\in\perp/\in_\|$ is 0.27 and the anisotropic dielectric constant is 10. The black voltage $V_b$ is 3.8V and cell gap is about 4 μm.

THE TABLE 5

|   | Cst/Clc | Tr(ms) | Tf(ms) | Tre(ms) | The cusp | Transmittance after frame(%) |
|---|---------|--------|--------|---------|----------|------------------------------|
| 1 | 0.44    | 4.81   | 15.38  | 20.19   | generated | 88 |
| 2 | 0.5     | 2.92   | 10.89  | 13.80   | not generated | 90 |
| 3 | 0.7     | 2.74   | 10.18  | 12.92   | not generated | 91 |
| 4 | 0.9     | 2.71   | 10.65  | 13.36   | not generated | 91 |

Figure 13:
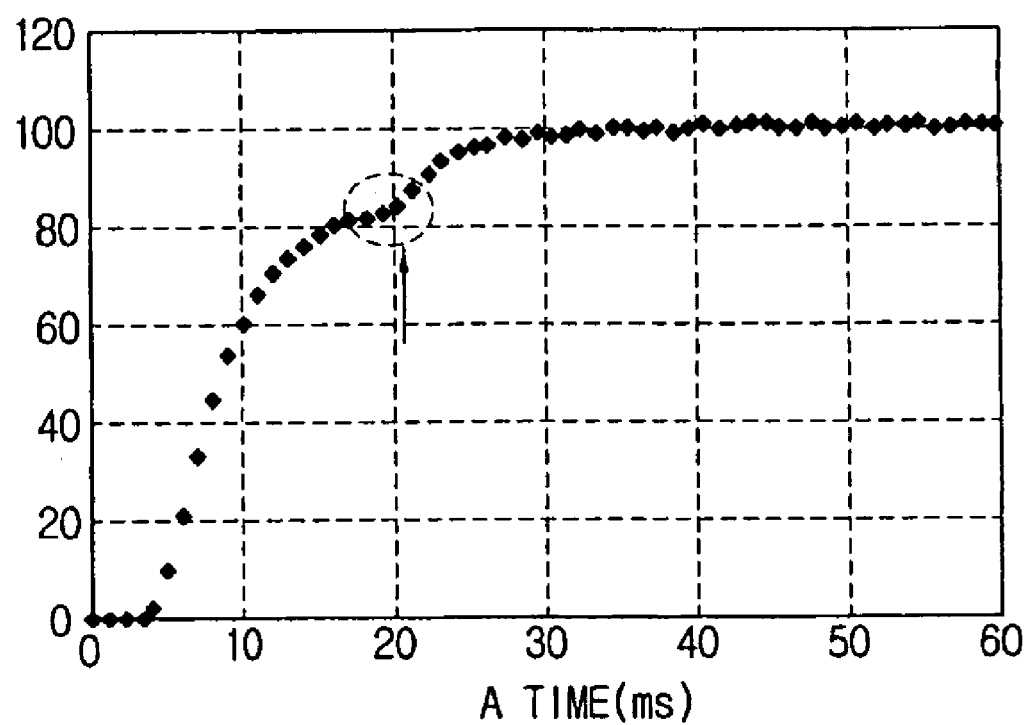
FIG. 13 is a graph showing transmittance with respect to time according to the first case in table 5.
Figure 14:
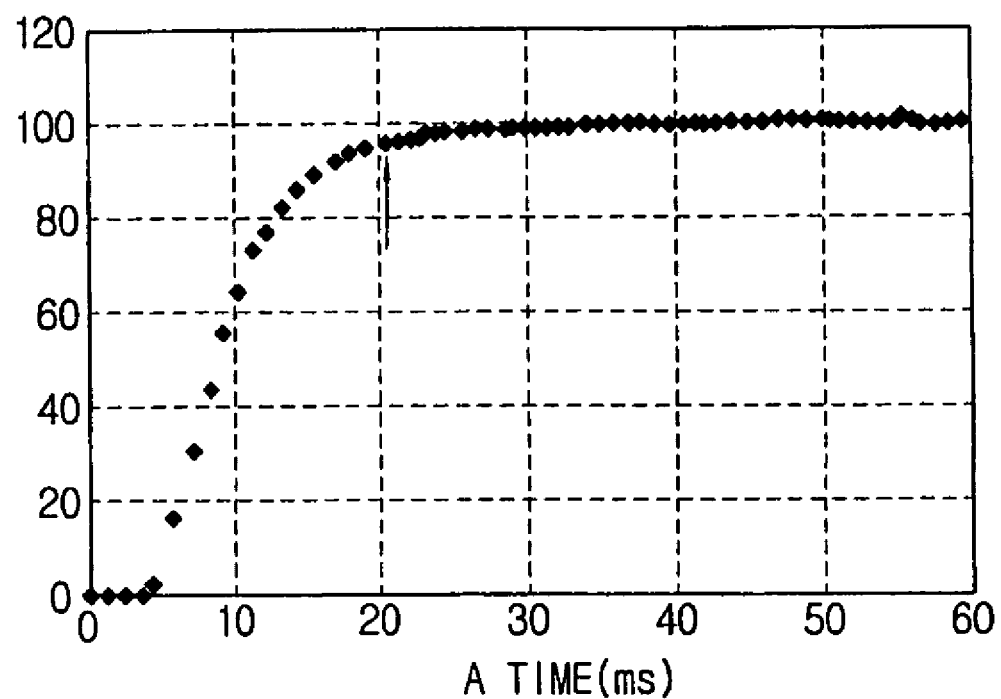
FIG. 14 is a graph showing transmittance with respect to time according to the second case in table 5.

FIG. 13 is a graph showing transmittance with respect to time in the first case of the table 5. FIG. 14 is a graph showing transmittance change with respect to time in the second case of the table 5. The response time is under 16 ms and the cusp does not occur when the ratio of the storage capacitance to the liquid crystal capacitance Cst/Clc is about or over 0.5.

The result of the table 5 is obtained by using the liquid crystals having $\in\perp/\in_\|$ of about 0.27. However, the same result (that the ratio of the storage capacitance to the liquid crystal capacitance is modulated) is obtained when $\in\perp/\in_\|$ of the liquid crystals is over about 0.27.

Although exemplary embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention.

What is claimed is:

1. A liquid crystal display comprising:
    a first substrate comprising a pixel electrode;
    a second substrate positioned opposite the first substrate and having a common electrode; and
    a liquid crystal layer disposed between the first substrate and the second substrate, wherein a black voltage is applied to the pixel electrode in a range of from about 3V to about 4.4V and a perpendicular direction dielectric constant $\in\perp$ of liquid crystals in the liquid crystal layer is greater than or equal to about 0.27 times of a horizontal direction dielectric constant $\in_\|$ of the liquid crystals,
    wherein a white voltage applied to the pixel electrode is less than or equal to about 0.5 times of a 10% voltage, wherein the 10% voltage refers to a voltage when a transmittance falls by 10% from a white state.

2. The liquid crystal display according to claim 1, wherein an anisotropic dielectric constant of the liquid crystals is in a range of about 7 to about 12.

3. The liquid crystal display according to claim 2, wherein a storage capacitance is greater than or equal to about 0.5 times of a liquid crystal capacitance.

4. The liquid crystal display according to claim 1, wherein a cell gap in the pixel electrode is about 4.0 μm.

5. The liquid crystal display according to claim 1, wherein a storage capacitance is greater than or equal to about 0.5 times of a liquid crystal capacitance.

6. A liquid crystal display comprising:

a pixel electrode; and a liquid crystal layer comprising a plurality of liquid crystal molecules, wherein a black voltage applied to the pixel is in a range from about 3V to about 4.4V and a perpendicular direction dielectric constant $\in_\perp$ of the liquid crystal molecules is greater than or equal to about 0.27 times of a horizontal direction dielectric constant $\in_\parallel$ of the liquid crystal molecules, wherein a white voltage applied to the pixel electrode is less than or equal to about 0.5 times of a 10% voltage, wherein the 10% voltage refers to a voltage when a transmittance falls by 10% from a white state.

7. The liquid crystal display according to claim 6, wherein an anisotropic dielectric constant of the liquid crystal molecules is in a range of about 7 to about 12.

8. The liquid crystal display according to claim 7, wherein a storage capacitance is greater than or equal to about 0.5 times of a liquid crystal capacitance.

9. The liquid crystal display according to claim 6, wherein a cell gap in the pixel electrode is about 4.0 μm.

10. The liquid crystal display according to claim 6, wherein a storage capacitance is greater than or equal to about 0.5 times of a liquid crystal capacitance.

* * * * *